United States Patent [19]
Aoki

[11] 4,255,028
[45] Mar. 10, 1981

[54] FOCUS DETECTING DEVICE IN CAMERA

[75] Inventor: Harumi Aoki, Kiyose, Japan

[73] Assignee: Asahi Kogaku Kogyo Kabushiki Kaisha, Tokyo, Japan

[21] Appl. No.: 65,250

[22] Filed: Aug. 9, 1979

[30] Foreign Application Priority Data

Aug. 24, 1978 [JP] Japan ................. 53-103214

[51] Int. Cl.³ .............................................. G03B 3/10
[52] U.S. Cl. ..................................................... 354/25
[58] Field of Search ................... 354/25, 31; 352/140; 355/56

[56] References Cited

U.S. PATENT DOCUMENTS

| 4,135,815 | 1/1979 | Masunaga et al. | 354/25 X |
| 4,160,587 | 7/1979 | Heiniger et al. | 354/25 |
| 4,173,402 | 11/1979 | Horike et al. | 354/25 |
| 4,176,928 | 12/1979 | Nakamura et al. | 354/25 |

Primary Examiner—Michael L. Gellner
Attorney, Agent, or Firm—Sughrue, Rothwell, Mion, Zinn and Macpeak

[57] ABSTRACT

A focalization detecting device in a camera utilizing a self-scanning type photoelectric device having a number of elements disposed at a position equivalent to the position of the image forming plane of a lens. A drive circuit drives the photoelectric element and a delay circuit delays a discrete output waveform of the photoelectric element the time corresponding to the scanning period of one or two elements. A difference circuit detects an output difference between the delayed waveform and the undelayed waveform. An absolute value circuit detects the absolute value of a difference output from the difference circuit and a peak value holding circuit holds a peak value in an absolute value waveform provided by the absolute value circuit in one scanning period of the photoelectric element, in such a manner that an output difference between said element is detected with a discrete photoelectric transducing output as it is. The maximum peak value output is provided when focus is obtained.

6 Claims, 7 Drawing Figures

FOCUS DETECTING DEVICE IN CAMERA

BACKGROUND OF THE INVENTION

This invention relates to a device for carrying out focus detection by utilizing the fact that the contrast signal of the image of an object reaches a maximum value when the correct focus is obtained.

The optical intensity of each spatial frequency of the image of an object, or the power spectrum, reaches a maximum value when the focus is obtained and the degree in variation of the power spectrum is most significant in a high spatial frequency range. A focus detecting device based on this characteristic has been proposed in that art. In this prior art device, the optical intensity signal in the high spatial frequency range of an object image is extracted, so that, when the signal thus extracted is at a maximum, the focus is detected. For instance, an automatic focussing device has been provided, in which an image object is mechanically or electrically scanned by using a photoelectric transducing element to convert the spatial brightness distribution of the object image into a time series signal. Then, the high frequency components of the waveform thereof are extracted by using a differentiation circuit or a high-pass filter. The lens is held in position when the output signal thereof is at its maximum value.

Recently, a method of utilizing a self-scanning type photoelectric element has been proposed as such a scanning technique. In this known method, a self-scanning type photoelectric element is disposed in the image forming plane of the lens, so that the spatial brightness distribution of the object image is converted into a discrete time series signal. This signal is converted into an analog signal by using a sample and hold circuit and a smoothing circuit. Then the analog signal is subjected to differentiation or the like to detect the focus. However, this conventional method is disadvantageous in that, because a low-pass filter is included in the smoothing circuit, the necessary high frequency components are eliminated. As a result, it is difficult to reproduce an analog waveform equivalent to the brightness distribution of the object image, and the circuit itself is unduly large.

SUMMARY OF THE INVENTION

Accordingly, an object of this invention is to provide a focus detecting device in which all of the above-described difficulties accompanying a conventional device have been eliminated.

More specifically, an object of the invention is to provide a focus detecting in which instead of converting the output signal of the self-scanning type photoelectric element into an analog waveform, contrast information is extracted with the discrete signal as it is, thereby to automatically carry out the focus detection.

These and other objects of this invention are accomplished by means of a focus detecting device in a camera, having a self-scanning type photoelectric device having a number of elements disposed at a position equivalent to the position of the image forming plane of a lens. A drive circuit drives the photoelectric element and a delay circuit delays a discrete output waveform of the photoelectric element the time corresponding to the scanning period for one or two elements. A difference circuit detects an output difference between the delayed waveform and the undelayed waveform. An absolute value circuit detects the absolute value of a difference output from the difference circuit. A peak value holding circuit holds a peak value in an absolute value waveform provided by the absolute value circuit in one scanning period of the photoelectric element, in such a manner that an output difference between elements is detected with a discrete photoelectric transducing output as it is. The maximum peak value output is provided when focus is obtained.

This invention will be described with reference to its preferred embodiment shown in the accompanying drawings.

BRIEF DESCRIPTION OF THE DRAWINGS

More specifically, FIG. 3(A) shows an original waveform in one scanning period which is outputted by a self-scanning type photoelectric device;

FIG. 3(B) shows a waveform which is obtained by delaying the original waveform the time corresponding to two elements;

FIG. 3(C) shows the waveform of the difference output between the two waveforms and;

FIG. 3(D) shows the waveform of the absolute value of the difference output.

DESCRIPTION OF THE PREFERRED EMBODIMENT

Figure 1:
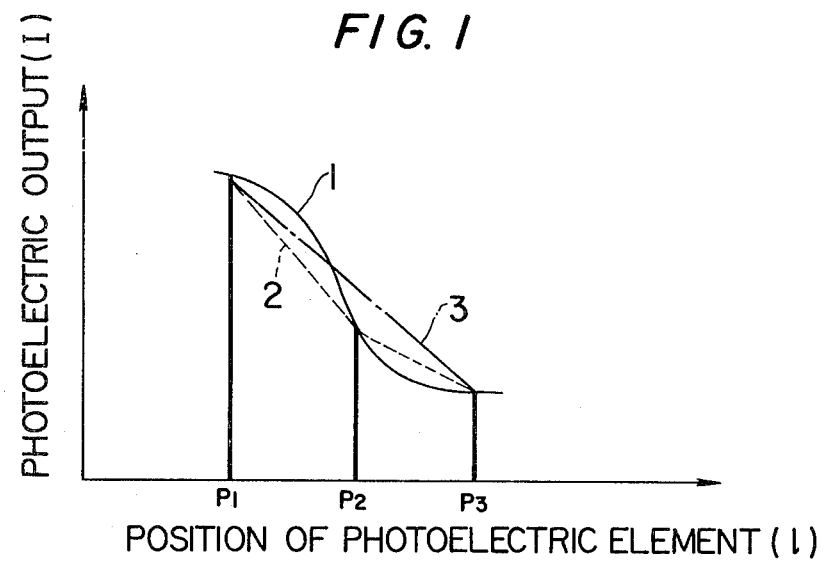
FIG. 1 is a graphical representation of the principle of a focus detecting mechanism according to this invention.

FIG. 1 is a graphical representation indicating the relationship between the photoelectric outputs of three given adjacent elements in a self-scanning type photoelectric element and the brightness distribution of the image of an object. In FIG. 1, reference characters $P_1$, $P_2$ and $P_3$ designates the three elements. When an object image having a bright distribution as indicated by the solid line 1 is applied to the photoelectric element, a pulsive discrete output is obtained.

It is assumed that the brightness distribution (solid line 1) of the object image is represented by $f(x)$. When the discrete output is converted into an analog waveform, then a distribution equivalent to the solid line 1 is reproduced. If the analog waveform is subjected to differentiation, then a distribution equivalent to the differential coefficient $f'(x)$ can be obtained. However, a value approximate to the differential coefficient $f'(x)$ can be extracted by numerical differentiation with the dispersed output, infiltered, that is as it is. Stated differently, a function $f(x_j)$ at a point $s_j$ can be expressed with a function at a point $x_i$ other than the point $x_j$ and the differential coefficient by Taylor's expansion.

$$f_j = f(x_i \pm mh)$$
$$= f_i \pm mhf_i' + \frac{(mh)^2}{2!} f_i'' \pm \frac{(mh)^3}{3!} f_i''' + $$
$$\ldots (m = 1, 2, 3, \ldots)$$

From this equation, the following $f_i'$ approximation equation can be obtained:

$$f_i' \approx 1/h(f_{i+1} - f_i) \quad (1)$$

$$f_i' \approx 1/2h(f_{i+1} - f_{i-1}) \quad (2)$$

The equation (1) includes an error of about $-h/2f_i''$, and the equation (2) includes an error of about $-h^2/6f_i'''$. Thus, the equation (2) is more approximate to the correct differential coefficient $f_i'$. Since equation (1) represents the output difference between two adjacent photoelectric elements, equation (1) corresponds to obtaining the gradient of the dotted line 2. Because equation (2) expresses the output difference between two photoelectric elements which are picked up every two elements, equation (2) corresponds to obtaining the gradient of the one-dot chain line 3.

Figure 2:
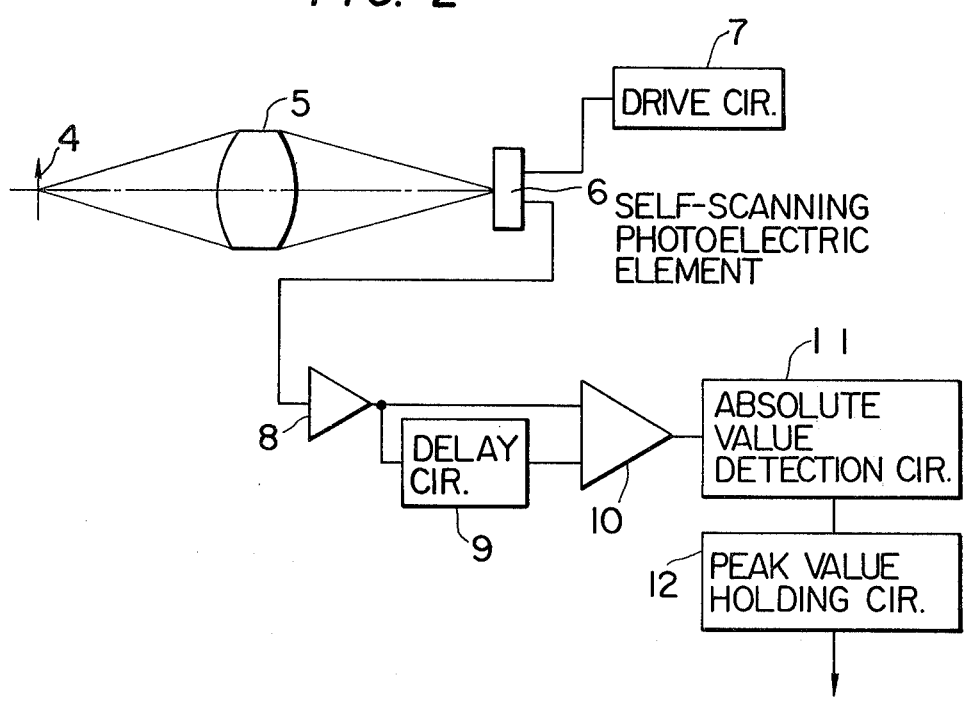
FIG. 2 is a block diagram of a circuit practicing a focus detecting method according to the invention.

A focus detecting device according to this invention is arranged as shown in FIG. 2. The above-described approximation equation is applied for the output of a self-scanning type photoelectric device 6 having a number of elements. The image of an object 4 is formed on the self-scanning type photoelectric element 6 with the aid of a lens 5. The self-scanning type photoelectric device 6 is driven by a drive circuit 7, so that the object image is electrically scanned. As a result, the brightness distribution is transduced photoelectrically to provide a discrete time series signal.

The output wave form of the self-scanning type photoelectric device 6 is amplified by an amplifier 8, and is then delayed by the time corresponding to the scanning period for one or two elements by a delay circuit 9. The waveform thus delayed is compared with the waveform which does not pass through the delay circuit 9, in a difference circuit 10. As a result a voltage value corresponding to the voltage difference between the two waveforms is produced.

The difference output is converted into a positive or negative voltage value by an absolute value circuit 11. The maximum value of the absolute value output in one scanning period is detected and held by a peak value holding circuit 12. The peak value output of the peak value holding circuit 12 is a signal indicating the status of focus.

FIGS. 3(A)-(D) show the variations of the waveform. More specifically, FIG. 3(A) shows the output signal of the amplifier circuit 8, FIG. 3(B) shows the waveform which is obtained by delaying the output signal of the amplifier circuit 8 the time corresponding two elements by the delay circuit 9, FIG. 3(C) shows the difference output waveform corresponding to the voltage difference between the two waveforms, and FIG. 3(D) shows a waveform indicating the absolute value of the difference output obtained by the absolute value circuit.

Figure 3:
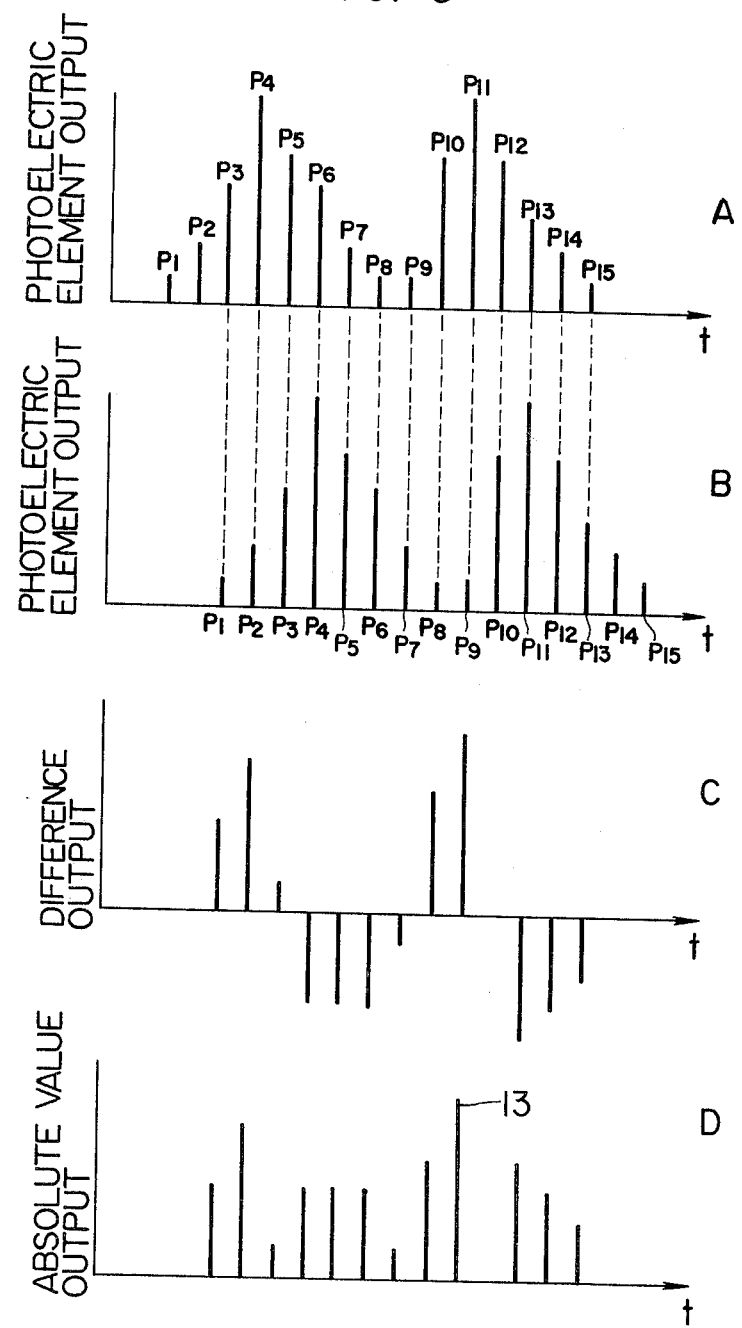
FIGS. 3(A)–(D) are graphical representations indicating the variations of a photoelectric output waveform in the circuit shown in FIG. 2.

In FIG. 3, the difference between the output of an element P11 and the output of an element P9 is the greatest, and therefore the peak value 13 appears in the absolute value output waveform (FIG. 3(D)). With a flat object, the absolute value output between each pair of elements shows the maximum value, when the focus is obtained. With a deep object, the brightness distribution concerning the minute parts of the object must be selectively extracted. If the peak value 13 is held, then only the part indicating the maximum contrast in the measurement range is extracted. Thus, the focus can also be detected for the deep object.

Figure 4:
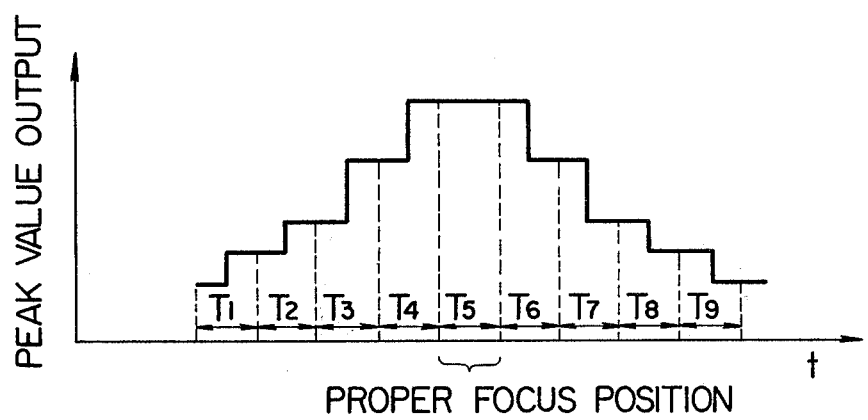
FIG. 4 is a graphical representation indicating the variations of a peak value when the lens is moved back and forth.

FIG. 4 shows the variations of the peak value in one scanning period when the lens is moved back and forth. In FIG. 4, $T_1, T_2, \ldots$ and $T_n$ designates scanning periods of the self-scanning type photoelectric device 6, respectively. The peak value in one scanning period is held until another peak value is provided in the next scanning period. Thus, FIG. 4 indicates the fact that the maximum peak value is obtained in the scanning period $T_5$, and at this time instant the lens reaches the proper focus position.

The self-scanning type photoelectric element can provide a large photoelectric output because it stores the quantity of incident light in one scanning period. If the scanning speed is decreased, then a high photoelectric output can be obtained from light low in intensity.

Because the self-scanning type photoelectric device is employed in the present invention as described above, the invention can achieve focus detection of high sensitivity when compared with the system which uses a photoelectric element array, in which no scanning is effected, to detect the photoelectric differences between the elements thereof. Furthermore, in the invention, the discrete photoelectric output is directly processed without analog waveform conversion. Therefore, the circuitry is relatively compact. In addition, the invention does not suffer from the elimination of high frequency components which may result in digital-to-analog conversion. Thus, the focus detecting device according to the invention is considerably higher in detection sensitivity.

What we claimed is:

1. A focus detecting device in a camera comprising: a single self-scanning type photoelectric device having a number of elements disposed at a position equivalent to the position of the image forming plane of a lens; a drive circuit for driving said photoelectric element to produce a single discrete time series output waveform; a delay circuit for delaying said single discrete time series output waveform of said single photoelectric element by the time corresponding to at least the scanning period for one element to produce a delayed waveform; signal processing circuit means determining variations of said delayed waveform and said discrete time series output waveform in one scanning period of said photoelectric device, wherein an output difference between said elements is detected as an unfiltered discrete photoelectric transducing output, and a maximum output is provided when proper focalization is obtained.

2. A focus detecting device as in claim 1 wherein said signal processing means comprises a difference circuit for detecting a difference between said delayed and discrete output waveforms and for producing a difference signal output.

3. A focus detecting device as in claim 2, wherein said signal processing means further comprises an absolute value circuit for detecting the absolute value of said difference signal output and a peak value holding circuit for holding a peak value detected by said absolute value circuit.

4. A focus detecting device as in claims 1, 2, or 3 wherein said delay circuit delays a discrete output waveform for a time corresponding to the scanning period for two elements of said self scanning photoelectric device.

5. A focus detecting device as in claims 1, 2 or 3 further comprising amplifier means interposed between said self-scanning photoelectric device and said delay circuit.

6. A focus detecting device as in claim 3, wherein said peak value holding circuit holds a single peak value detected by said absolute value circuit, the output of said focus detecting device being responsive to said single peak value.

* * * * *